United States Patent Office 3,790,545
Patented Feb. 5, 1974

3,790,545
PREPARATION OF HIGH CIS-CONTENT POLYPENTENAMER POLYMERS
Robert J. Minchak, Parma Heights, Ohio, assignor to The B. F. Goodrich Company, New York, N.Y.
No Drawing. Filed May 18, 1972, Ser. No. 254,631
Int. Cl. C08f 1/34
U.S. Cl. 260—93.1
8 Claims

ABSTRACT OF THE DISCLOSURE

Polypentenamer polymers having high cis-content are prepared in a process comprising polymerizing cyclopentene monomer with a catalyst comprising an organoaluminum compound and a tungsten salt at a temperature of from about −40° C. to about −60° C. and below. The tungsten salt is added after the organoalumium compound and at polymerization temperatures. The polymers are sulfur-vulcanizable and have good low temperature properties.

BACKGROUND OF THE INVENTION

Cycloolefins can be polymerized through the olefin structure to yield-poly-cycloaliphatics, or through a ring-opening process to yield unsaturated linear polymers. The latter process has particular appeal as the polymers made are sulfur-vulcanizable. As cyclopentene is a readily available byproduct from certain ethylene production processes, much of the art focuses on the ring-opening polymerization of cyclopentene. Recent patents and publications have disclosed many catalyst systems, polymerization processes, and the physical properties of the polymers made: U.S. Pats. 3,492,245; 3,577,400; 3,632,849; 3,598,796; 3,634,376; and 3,631,010, and Dall'Asta et al., Die Angewandte Makromolekulare Chemie, 16/17, No. 207, pg. 51 (1971), Natte et al., Angew, Che. Internat. Edit., vol. 3, No. 11, pg. 723 (1964), Calderon et al., Journal of Polymer Science, Part A-1, vol. 5, pg. 2209 (1967), Scott et al., Rubber Chemistry and Technology, vol. 44, No. 5, pg. 1341 (1971), Dall'Asta et al., Rubber Chemistry and Technology, vol. 43, pg. 1235 (1970), and Haas et al., Rubber Chemistry and Technology, vol. 44, pg. 1116 (1971).

The ring-opening polymerization of cyclopentene can yield either a predominantly trans- or a predominantly cis-structure. The aforementioned art teaches that the use of a tungsten salt as a catalyst component will yield a high trans-content polypentenamer polymer, while the use of a molybdenum salt will yield a predominantly cis-polypentenamer polymer. The trans-polymer has a high (+15° C.) crystalline melting point, making it too stiff for many applications. The cis-polymer, on the other hand, has a crystalline melting point of −40° C., making it an excellent polymer for low temperature applications. Unfortunately, the molybdenum catalyst is harder to use being less soluble in monomer and solvent, and less active than the tungsten catalyst.

SUMMARY OF THE INVENTION

The invention provides a process for the preparation of polypentenamer polymers having a cis-content of about 90 percent to 100 percent by weight based upon the weight of the polymer, comprising polymerizing cyclopentene monomer with a catalyst comprising an organoaluminum compound and a tungsten salt at a temperature of from about −40° C. to about −60° C., wherein the tungsten salt is added after the organoaluminum compound and at polymerization temperatures.

DETAILED DESCRIPTION

The cyclopentene is polymerized to a linear, unsaturated polypentenamer of predominantly cis-structure. The catalyst system comprises a tungsten salt and an organoaluminum compound.

Examples of the tungsten salt are tungsten halides such as tungsten hexachloride, tungsten hexabromide, tungsten hexafluoride, tungsten hexaiodide, tungsten heptabromide, tungsten heptachloride and tungsten halogen oxides and alkoxides such as tungsten tetrachloro-oxide and tungsten pentachloride ethoxide.

The organoaluminum compounds are of the formula $AlR_xX_y$ wherein R is an alkyl radical containing 1 to 12 carbon atoms or an aryl radical containing 6 to 14 carbon atoms, X is halogen such as chlorine and bromine, and $x=0$ to 3 and $y=0$ to 3 and the sum of $x$ and $y$ is equal to 3. Examples of such organoaluminums are alkyl aluminum such as trimethyl aluminum, triethyl aluminum, tri-n-propyl aluminum, triisopropyl aluminum, trisobutyl aluminum, trihexyl aluminum, trioctyl aluminum, triisooctyl aluminum, tridecy aluminum and the like; aryl aluminums such as triphenyl aluminum, tribenzyl aluminum, tritolyl aluminum, and the like; organoaluminum halides such as diethyl aluminum chloride, diethyl aluminum bromide, diethyl aluminum fluoride, diisopropyl aluminum chloride, dibutyl aluminum bromide, diisobutyl aluminum iodide, dihexyl aluminum chloride, methyl aluminum dichloride, ethyl aluminum dichloride, ethyl aluminum dibromide, n-butyl aluminum dichloride, hexyl aluminum dibromide, octyl aluminum bromide, diphenyl aluminum dichloride, phenyl aluminum dibromide, and the like; and aluminum trihalides such as aluminum trichloride and aluminum tribromide.

More preferred of the tungsten salts are the tungsten halides, especially tungsten hexahalides. Excellent results were obtained using tungsten hexachloride. More preferred among the organoaluminum compounds are the lower alkyl aluminums and lower alkyl aluminum halides such as trimethyl aluminum, triethyl aluminum, triisopropyl aluminum, tributyl aluminum, diethyl aluminum chloride, fluoride, and bromide, dibutyl aluminum chloride and iodide, ethyl aluminum dichloride.

The tungsten salt is employed at a level from about 0.01 to about 10 millimoles per mole of cyclopentene, and more preferably from about 0.1 to about 5 millimoles per mole of cyclopentene. The organoaluminum compound is used in a molar ratio of organoaluminum compound to tungsten salt (Al/W ratio) of from about 0.2/1.0 to about 20/1.0 moles per mole and higher.

A polymerization activator can be used. Examples of such include water, methanol, ethanol, isopropyl alcohol, benzyl alcohol, phenol, ethyl mercaptan, 2-chloroethanol, 1,3-dichloropropanol, p-bromophenol, epichlorohydrin, ethylene oxide, cyclopentene-2-hydroperoxide, cumyl hydroperoxide, tertiary butyl peroxide, benzoyl peroxide, and air or oxygen. High cis-content was obtained both with and without the aid of activators. Excellent activation was obtained using air or a peroxide or hydroperoxide as the activator, especially when using benzoyl peroxide.

The activators are employed in a range from about 0.1 mole to about 10 moles per mole of organoaluminum compound used. The activator can be added at any point in the charge procedure, but it is more preferably added last, after the tungsten salt.

A molecular weight modifier can be used. Such modifiers are typically acyclic olefins such as 1-butene, 3-methyl-1-butene, and the like. From about 0.1% up to equal parts by weight based upon the weight of the monomer charged is employed. To obtain ultra-high molecular weight it is desirable to have no modifier present. The olefin modifier can be added at any point in the charge procedure, but it is more preferredly added along with the cyclopentene monomer.

The polymerization can be performed as a batch or continuous process and in bulk or in solution. Examples of solvents are pentane, heptane, hexane, isooctane, toluene, and the like, and mixtures of these with cyclopentane, cyclohexane, benzene, xylene, chlorobenzene, and the like. Toluene was found to be an excellent solvent. The solvent can be charged at any point in the procedure, but a more preferred method is to mix the monomer and solvent together and charge all at once.

The process is particularly directed to the preparation of cis-polypentenamer polymer. However, up to 30% by weight of a copolymerizable monomer can be used, based upon the total weight of the monomer charged. Such copolymerizable monomers include monocyclic dienes such as cyclopentadiene; dicyclic dienes such as dicyclopentadiene and 3-ethyl-bicyclonondiene; norbornenes such as 5-ethylidene - 2 - norbornene and 2 - isopropenyl-5-norbornene; tricyclic dienes such as 3 - methyl - tricyclo- $(5,2,1,0^{2,6})$ - 3,8 - decadiene; and other monocyclic monoolefins such as cyclobutene, cycloheptene, cyclooctene, cyclodecene, and the like. More preferredly, the copolymerizable monomers are used in a range from about 0.5% to about 10% by weight based upon the total weight of monomer charged.

The monomer(s) can be added at any point in the charging procedure. Normally the monomer(s), solvent if used, and modifier if used are added first to the reactor vessel. These ingredients can be added separately or as a mixture of ingredients. The organoaluminum compound is then added, usually as a solution in a solvent such as benzene and the like. The tungsten salt is added, usually as a solution in a solvent such as benzene and the like, followed by activator if used. As mentioned in the specification, this procedure can be varied. The only prerequisite is that the tungsten salt is added after the organoaluminum compound, and at polymerization temperatures. The reaction mixture in the reactor vessel can be cooled down to polymerization temperature at the start of the additions or any point before the addition of the tungsten salt.

Polymerization temperature is from about $-40°$ C. to about $-60°$ C. and below. Polymerization time is from about 0.25 hour to about 20 hours, but more typically is from about 1 to 4 hours. Percent conversions of monomer to polymer of over 50% are readily obtained. The polymerization is short stopped by addition of alcohols, amines, or carboxylic acids such as ethanol, t-butyl phenol, diethylamine, acetic acid and the like.

The polymers can be isolated by direct drying under reduced pressure, by precipitation using an alcohol such as methanol, ethanol or isopropanol, or by steam or hot water stripping. The polymer is recovered and can be further washed with water or alcohol and then dried. The polypentenamers are high molecular weight products having a dilute solution viscosity (DSV) from about 0.5 to about 20 as measured at a concentration of 0.1 gram in 100 milliliters of toluene at 25° C. The polymers have a high cis-content, about 90% by weight to 100% cis-content. The cis-content is determined by using infrared spectrum technique developed for measuring cis- and trans-content in polybutadiene rubber.

The high cos-content polypentenamers are readily vulcanized to elastomers having good low temperature properties. Elemental sulfur or a thiuram di- or polysulfide can be used along with a broad range of accelerators and other compounding ingredients. Since the polymers are unsaturated, an antioxidant or stabilizer is normally used. Examples of accelerators are zinc and lead dimethyl dithiocarbamate, sodium dibutyl dithiocarbamate, N-petamethylene - ammonium - N - pentamethylene dithiocarbamate, 2 - mercaptobenzothiazole, 2 - benzothiazole - 4 - morpholinyl - disulfide, 2,2' - benzothiazyl disulfide, N-t-butyl-2-benzothiazole sulfenamide, N - cyclohexyl - 2 - benzothiazole sulfenamide, N,N,N',N'-tetramethyl thiocarbamylsulfenamide, tetramethylthiuram monosulfide and tetraethylthiuran monosulfide.

Also used are vulcanization activtators such as zinc, magnesium oxide, fatty acids such as stearic and lauric acid and metal salts thereof; fillers such as the carbon blacks, calcium and magnesium carbonates, aluminum silicates, and the like; plasticizers and extenders such as dialkyl and diaryl organic acids and aromatic, naphthalenic and paraffinic oils. Examples of antioxidants, antiozonants, and stabilizers are di-β-naphthyl-p-phenylenediamine, phenyl-β-naphthylamine, 2,6-di-t-butyl paracresol, 2,2' - methylenebis - (4 - ethyl-6-t-butyl phenol), 2.2'-thiobis - (4 - methyl - 6 - t-butyl phenol), distearyl thiodipropionate, tri(nonylatedphenyl)phosphite, and the like. Other ingredients such as pigments, tackifiers, flame retardants, fungicides, and the like can be used.

The polymers are cured at temperatures from about 250° F. to about 400° F., whereas a temperature from about 280° F. to about 375° F. is more preferred. Cure times can be determined using a Monsanto Rheometer or a B.F.G. Cone Curometer as described in U.S. Pat. 3,494,172.

The vulcanized compositions are useful as cements in solution, adhesives, gaskets, seals, protective coatings, lining, tires and the like.

The following examples serve to more fully illustrate the invention.

EXAMPLES

The polymerizations were performed following a similar procedure. Glass or glass-lined reactor vessels were used. The vessel was well cleaned prior to the run with soap and water, followed by an acetone rinse and flushed with nitrogen until dry. The polymerization ingredients were charged in the order:

(1) Charge in any order or as mixtures of one or more ingredients, the cyclopentene, the copolymerizable monomer, the solvent, and the olefin modifier.

(2) Charge the organoaluminum compound, followed by lowering the temperature to the desired polymerization temperature.

(3) Charge the tungsten salt, followed by the activator.

The polymerizations produced little heat. Cooling was provided by Dry Ice/acetone or Dry Ice/ethanol baths. Little agitation was required for efficient polymerization. The reactions were shortstopped by the addition of ethanol, and the polymers isolated by precipitating them out of solution using ethanol. About 1 part by weight of di-t-butyl paracresol was added to the polymer as an antioxidant.

EXAMPLE I

Cyclopentene was polymerized to prepare polypentenamer polymers of 91% to 97% cis-structure. The following recipes were used:

|  | 1 | 2 | 3 | 4 |
|---|---|---|---|---|
| Toluene, gms | 28 | 35 | 380 | 380 |
| Cyclopentene: |  |  |  |  |
| Gms | 24 | 15 | 118 | 118 |
| Moles | 0.35 | 0.22 | 1.74 | 1.74 |
| Triethyl aluminum: |  |  |  |  |
| Gms | 0.009 | 0.009 | 0.136 | 0.114 |
| Millimoles | 0.075 | 0.075 | 1.2 | 1.0 |
| Tungsten hexachloride: |  |  |  |  |
| Gms | 0.027 | 0.027 | 0.119 | 0.119 |
| Millimoles | 0.068 | 0.068 | 0.3 | 0.3 |
| Al/W ratio | 1.1 | 1.1 | 4 | 3.3 |
| Temperature, ° C | −40 | −40 | −60 | −60 |
| Time, hours | 12.5 | 12.5 | 0.5 | 3 |
| Polymer, gms | 16.2 | 8.4 | 60 | 44 |
| Percent yield | 58 | 56 | 51 | 37 |
| DSV | 3.6 | 3.5 | 5.9 | 7.8 |
| Percent cis structure | 97 | 96 | 91 | 94 |

The cyclopentene was mixed with toluene and added to the reactor vessel. The triethylaluminum was then added as a 0.5 molar solution in benzene. The temperature was lowered to the polymerization temperature by external cooling using a Dry Ice/ethanol mix. Cooling time was from about 15 minutes to about 60 minutes. The tungsten hexachloride was added as a 0.1 molar solution in benzene. Polymerization was initiated upon the addition of the tungsten salt, often seen as foaming of the solution. In samples 1 and 2, the tungsten hexachloride was added in increments throughout the run. 0.017 millimole was initially added, followed by 0.017 millimole additions at about 5 minutes, about 20 minutes, and about 120 minutes (sample 1) and 210 minutes (sample 2) into the run. The tungsten hexachloride was added all initially in samples 3 and 4. The reactor contents were agitated at intervals throughout the run. The reaction was shortstopped with ethanol. The polymer was precipitated out using alcohol, recovered, and dried at 50° C.

Percent cis-content was determined using infrared procedures using polybutadiene polymers as standards. Percent yield is based on the amount of cyclopentene monomer charged. Dilute solution viscosity was measured on a solution of 0.1 gram of polymer in 100 milliliters of toluene at 25° C. High cis-structure was obtained in all of the samples. The variation in Al/W ratio had no effect on the cis-content.

EXAMPLE II

Cyclopentene was polymerized following the procedure of Example I. In this series of runs, an olefin modifier was added to the solution of cyclopentene and toluene, and charged as a mixture. The tungsten hexachloride was added all initially. The recipes used and data obtained were as follows.

|  | 1 | 2 | 3 |
|---|---|---|---|
| Toluene, gms | 44 | 44 | 44 |
| Cyclopentene: |  |  |  |
| Gms | 7.7 | 7.7 | 7.7 |
| Moles | 0.11 | 0.11 | 0.11 |
| 3-methyl-1-butene, gms |  | 0.018 | 0.054 |
| Triethylaluminum: |  |  |  |
| Gms | 0.014 | 0.014 | 0.014 |
| Millimoles | 0.12 | 0.12 | 0.12 |
| Tungsten hexachloride: |  |  |  |
| Gms | 0.029 | 0.029 | 0.029 |
| Millimoles | 0.074 | 0.074 | 0.074 |
| Al/W ratio | 1.6 | 1.6 | 1.6 |
| Temperature, °C | −45 | −45 | −45 |
| Time, hours | 0.5 | 0.5 | 0.5 |
| Polymer, gms | 3.4 | 3.6 | 3.7 |
| Percent yield | 44 | 47 | 48 |
| DSV | 9.4 | 8.0 | 5.0 |
| Percent cis-structure | 98 | 97 | 98 |

EXAMPLE III

Cyclopentene was polymerized following the procedure of Example I. An activator (air) was used. The air was added at about 1 to 5 minutes after the addition of the tungsten salt (which was added all initially). The recipes used and the data obtained were as follows:

|  | 1 | 2 | 3 |
|---|---|---|---|
| Toluene, gms | 72 | 70 | 67 |
| Cyclopentene: |  |  |  |
| Gms | 15 | 15 | 15 |
| Moles | 0.22 | 0.22 | 0.22 |
| Air: |  |  |  |
| Gms |  | 0.005 | 0.011 |
| Millimoles |  | 0.18 | 0.36 |
| Triethyl aluminum: |  |  |  |
| Gms | 0.011 | 0.011 | 0.011 |
| Millimoles | 0.10 | 0.10 | 0.10 |
| Tungsten hexachloride: |  |  |  |
| Gms | 0.020 | 0.020 | 0.020 |
| Millimoles | 0.05 | 0.05 | 0.05 |
| Al/W ratio | 2 | 2 | 2 |
| Activator/Al ratio |  | 1.8 | 3.6 |
| Temperature, °C | −50 | −50 | −50 |
| Time, hours | 4 | 1.5 | 2 |
| Polymer, gms | 2.3 | 9.0 | 9.2 |
| Percent yield | 15 | 60 | 62 |
| DSV | 14 | 15 | 15 |
| Percent cis-structure | 90 | 100 | 100 |

The polymers had high cis-content. The activator's (air) effect was to increase the activity of the catalyst system and produce more polymer. This can be seen in the higher yields.

EXAMPLE IV

A series of polymerizations were made using both an activator and an olefin modified. The toluene, cyclopentene, and modifier (1-butene) were admixed and charged to the reactor vessel. The triethyl aluminum, as a 0.5 molar solution in benzene, was added and the contents cooled to run temperature using a Dry Ice/ethanol mixture as a coolant. The tungsten hexachloride was then added, as a 0.1 molar solution in benzene, followed by the activator (benzoyl peroxide) as a 0.1 molar solution in benzene. The recipes used, along with the data obtained, are listed in the following table.

|  | 1 | 2 | 3 | 4 | 5 | 6 | 7 | 8 | 9 | 10 | 11 |
|---|---|---|---|---|---|---|---|---|---|---|---|
| Toluene, gms | 32 | 32 | 32 | 32 | 33 | 33 | 33 | 34 | 34 | 34 | 34 |
| Cyclopentene: |  |  |  |  |  |  |  |  |  |  |  |
| Gms | 9.6 | 9.6 | 9.6 | 9.6 | 9.6 | 9.6 | 9.6 | 9.6 | 9.6 | 9.6 | 9.6 |
| Moles | 0.14 | 0.14 | 0.14 | 0.14 | 0.14 | 0.14 | 0.14 | 0.14 | 0.14 | 0.14 | 0.14 |
| 1-butene, gms | 0.012 | 0.06 | 0.60 | 1.20 |  | 0.06 | 0.60 | 0.002 | 0.012 | 0.06 | 0.60 |
| Triethylaluminum: |  |  |  |  |  |  |  |  |  |  |  |
| Gms | 0.009 | 0.009 | 0.009 | 0.009 | 0.011 | 0.011 | 0.01 | 0.10 | 0.009 | 0.009 | 0.009 |
| Millimoles | 0.075 | 0.075 | 0.075 | 0.075 | 0.10 |  |  |  | 0.075 | 0.075 | 0.075 |
| Tungsten hexachloride: |  |  |  |  |  |  |  |  |  |  |  |
| Gms | 0.020 | 0.020 | 0.020 | 0.020 | 0.020 | 0.020 | 0.020 | 0.020 | 0.020 | 0.020 | 0.020 |
| Millimoles | 0.05 | 0.05 | 0.05 | 0.05 | 0.05 | 0.05 | 0.05 | 0.05 | 0.05 | 0.05 | 0.05 |
| Benzoyl peroxide: |  |  |  |  |  |  |  |  |  |  |  |
| Gms | 0.006 | 0.006 | 0.006 | 0.006 | 0.006 | 0.006 | 0.006 | 0.003 | 0.003 | 0.003 | 0.003 |
| Millimoles | 0.025 | 0.025 | 0.025 | 0.025 | 0.025 | 0.025 | 0.025 | 0.0125 | 0.0125 | 0.0125 | 0.0125 |
| Al/W ratio | 1.5 | 1.5 | 1.5 | 1.5 | 2 | 2 | 2 | 1.5 | 1.5 | 1.5 | 1.5 |
| Activator/Al ratio | 0.3 | 0.3 | 0.3 | 0.3 | 0.25 | 0.25 | 0.25 | 0.015 | 0.015 | 0.015 | 0.015 |
| Temperature, °C | −40 | −40 | −40 | −40 | −45 | −45 | −45 | −50 | −50 | −50 | −50 |
| Time, hours | 2.25 | 2.25 | 2.25 | 2.25 | 2.5 | 2.5 | 2.5 | 4.75 | 4.75 | 4.75 | 4.75 |
| Polymer, gms | 4.9 | 2.7 | 4.6 | 4.0 | 4.0 | 4.7 | 4.0 | 4.5 | 5.2 | 3.5 | 6.3 |
| Percent yield | 51 | 28 | 48 | 42 | 42 | 49 | 42 | 47 | 54 | 36 | 66 |
| DSV | 4.5 | 4.6 | 1.5 | 1.2 | 16 | 7.5 | 5 | 15 | 12 | 7 | 4 |
| Percent cis-structure | 94 | 98 | 99 | 98 | 97 | 97 | 98 | 99 | 98 | 99 | 100 |

The polypentenamer polymers all had high cis-structure. Use of the olefin modifier did not effect the cis-content. However, the modifier did reduce the molecular weight as can be seen in the DSV values.

At each run temperature, the effect of increasing the level of modifier was to reduce the molecular weight (as seen in the DSV values) of the polymer made. Generally, higher molecular weight polymer was produced at lower polymerization temperatures. All runs produced high cis-content polypentenamer polymers.

In addition to triethyl aluminum, other organoaluminum catalysts were used with similar results. Such catalysts were triisobutyl aluminum, diethyl aluminum chloride, ethyl aluminum dichloride, diethyl aluminum iodide, diethyl aluminum fluoride, and aluminum trichloride.

EXAMPLE V

A cis-polypentenamer polymer was prepared following the procedure of Example III. The polymerization recipe was 387 grams of toluene, 128 grams of cyclopentene, 0.6 millimole of triethyl aluminum and 0.3 millimole of tungsten hexachloride. The Al/W ratio was 2/1. Air, as the activator, was used at a level of 1.8 millimoles or an activator/Al ratio of 3/1. At 35 minutes into the run, 10 grams of butene-1 modifier was added to the reaction. Polymerization temperature was $-60°$ C., and run time was 2 hours. The reaction was shortstopped using ethanol and the polymer isolated. 49 grams of polymer was recovered, indicating a yield of about 38 percent. The DSV of the polymer was 6.1. The percent cis-content was 96 percent by weight.

The polymer made above and the polymer made in Example I, run 3 were admixed with compounding ingredients and cured. The ingredients were added using a two-roll mill operating at a roll temperature of 140° F. The recipes used were (in parts by weight):

|  | 1 | 2 |
|---|---|---|
| Polymer | 100 | 100 |
| N220 black | 75 | 75 |
| Oil | 50 | 50 |
| Stearic acid | 1.0 | 1.0 |
| Zinc oxide | 1.0 | |
| Sulfur | 3.0 | 3.0 |
| Santocure | 0.6 | 0.6 |
| Cure, 30′ at 320° F.: | | |
| 100% modulus, p.s.i.g | 340 | 260 |
| Tensile, p.s.i.g | 1,550 | 1,440 |
| Elongation, percent | 400 | 420 |
| Gehman freeze point, ° C | −91 | −103 |

The tensile and elongation properties were determined following ASTM D412. Gehman Freeze was determined following ASTM D1053. The raw polymer Mooney values of the polymers, ML-4 at 212° F., were 50 and 76, respectively. The example shows that the cis-polypentenamers cure readily using a sulfur-vulcanizing system, and that the polymers have excellent low temperature properties.

I claim:

1. A process for the preparation of polypentenamer polymer having a cis-content of about 90 percent to 100 percent by weight comprising polymerizing cyclopentene monomer at a temperature from about $-40°$ C. to about $-60°$ C., using a catalyst comprising an organoaluminum compound of the formula $AlR_xX_y$ wherein R is an alkyl radical containing 1 to 12 carbon atoms or an aryl radical containing 6 to 14 carbon atoms, X is halogen and $x=0$ to 3 and $y=0$ to 3 and the sum of $x$ and $y$ is equal to 3 and tungsten hexachloride, wherein the tungsten hexachloride is added after the organoaluminum compound and at polymerization temperature; and wherein said tungsten hexachloride is used at a level from about 0.01 to about 10 millimoles per mole of cyclopentene monomer, and the organoaluminum compound is used in a molar ratio of organoaluminum compound to tungsten hexachloride of from about 0.2/1.0 to about 20/1.0 moles per mole.

2. A process of claim 1 wherein the cyclopentene monomer is dissolved in a solvent therefor.

3. A process of claim 1 wherein a polymerization activator is employed; said activator used at a level from about 0.1 to about 10 moles per mole of organoaluminum compound.

4. A process of claim 1 wherein a molecular weight modifier is employed; said modifier used at a level from about 0.1 percent up to equal parts by weight based upon the weight of monomer charged.

5. A process of claim 2 wherein the organoaluminum compound is selected from the group consisting of triethyl aluminum, triisobutyl aluminum, diethyl aluminum chloride, ethyl aluminum dichloride, diethyl aluminum fluoride, and aluminum trichloride.

6. A process of claim 5 wherein the solvent is toluene.

7. A process of claim 2 comprising adding cyclopentene monomer and a solvent to a reactor, adding an organoaluminum compound, lowering the temperature to the polymerization temperature, adding the tungsten salt, polymerizing the cyclopentene at a temperature of from about $-40°$ C. to about $-60°$ C., and recovering the resultant polymer.

8. A process of claim 6 wherein the organoaluminum compound is triethyl aluminum.

References Cited

UNITED STATES PATENTS

| 3,476,728 | 11/1969 | Natta et al. | 260—93.1 |
| 3,492,245 | 1/1970 | Calderon et al. | 252—429 |
| 3,577,400 | 5/1971 | Judy | 260—88.2 |

STANFORD M. LEVIN, Primary Examiner

U.S. Cl. X.R.

260—23 R, 88.2 B, 88.2 F